(12) United States Patent
Dickie

(10) Patent No.: US 10,996,648 B2
(45) Date of Patent: *May 4, 2021

(54) APPARATUS AND METHOD FOR THIRD PARTY CREATION OF CONTROL LOGIC

(71) Applicant: General Electric Company, Schenectady, NY (US)

(72) Inventor: Kenneth Pierson Dickie, Edmonton (CA)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 175 days.

This patent is subject to a terminal disclaimer.

(21) Appl. No.: 16/253,470

(22) Filed: Jan. 22, 2019

(65) Prior Publication Data

US 2019/0155242 A1 May 23, 2019

Related U.S. Application Data

(63) Continuation of application No. 14/376,535, filed as application No. PCT/US2012/044770 on Jun. 29, 2012, now Pat. No. 10,216,166.

(51) Int. Cl.
*G05B 19/42* (2006.01)
*G05B 19/05* (2006.01)
(Continued)

(52) U.S. Cl.
CPC ....... *G05B 19/056* (2013.01); *G05B 19/0426* (2013.01); *G05B 19/054* (2013.01);
(Continued)

(58) Field of Classification Search
CPC .............. G05B 19/056; G05B 19/0426; G05B 19/054; G05B 23/0243; G05B 2219/1204; G06Q 30/016
See application file for complete search history.

(56) References Cited

U.S. PATENT DOCUMENTS 5,530,643 A 6/1996 Hodorowski
5,870,537 A 2/1999 Kern et al.
(Continued)

FOREIGN PATENT DOCUMENTS

CN 1363072 A 8/2002
CN 1857877 A 11/2006
(Continued)

OTHER PUBLICATIONS

U.S. Non-Final Office Action issued in connection with related U.S. Appl. No. 14/376,958 dated Jun. 2, 2017.
(Continued)

*Primary Examiner* — Wissam Rashid
(74) *Attorney, Agent, or Firm* — Armstrong Teasdale LLP

(57) ABSTRACT

Third party developed control logic for automation controllers is provided to customers using a communication network. At least one tool is provided for a third party to develop control logic for an automation controller. The automation controller is remotely located from the communication network. A hardware platform on which to operate the control logic is selected. Once built, the control logic is linked to at least one operational characteristic of the hardware platform such that the control logic is operable to perform at least one predetermined function of the automation controller using the hardware platform.

20 Claims, 4 Drawing Sheets

(51) Int. Cl.
  *G05B 19/042* (2006.01)
  *G05B 23/02* (2006.01)
  *G06Q 30/00* (2012.01)
(52) U.S. Cl.
  CPC ....... *G05B 23/0243* (2013.01); *G06Q 30/016* (2013.01); *G05B 2219/1204* (2013.01)

(56) References Cited

U.S. PATENT DOCUMENTS

| | | |
|---|---|---|
| 6,353,926 B1 | 3/2002 | Parthesarathy et al. |
| 6,445,963 B1 | 9/2002 | Blevins et al. |
| 6,449,624 B1 | 9/2002 | Hammack et al. |
| 6,567,937 B1 | 5/2003 | Flores et al. |
| 6,704,735 B1 | 3/2004 | Salo et al. |
| 6,799,080 B1 | 9/2004 | Hylden et al. |
| 6,882,890 B2 | 4/2005 | Horn et al. |
| 6,904,449 B1 | 6/2005 | Quinones |
| 7,103,647 B2 | 9/2006 | Aziz |
| 7,127,330 B2 | 10/2006 | Spool et al. |
| 7,143,186 B2 | 11/2006 | Stewart et al. |
| 7,246,078 B2 | 7/2007 | Vincent |
| 7,257,620 B2 | 8/2007 | Lo |
| 7,290,244 B2 | 10/2007 | Peck et al. |
| 7,318,044 B2 | 1/2008 | Matsuoka et al. |
| 7,330,473 B1 | 2/2008 | Baier et al. |
| 7,392,421 B1 | 6/2008 | Bloomstein et al. |
| 7,401,059 B1 | 7/2008 | Owen et al. |
| 7,523,045 B1 | 4/2009 | Walker et al. |
| 7,634,757 B2 | 12/2009 | De et al. |
| 7,738,975 B2 | 6/2010 | Denison et al. |
| 7,747,404 B2 | 6/2010 | Meckelburg et al. |
| 7,778,883 B2 | 8/2010 | Alabazz et al. |
| 7,860,609 B2 | 12/2010 | Yanagita et al. |
| 7,861,223 B1 | 12/2010 | Schmidt et al. |
| 7,870,223 B2 | 1/2011 | Grgic et al. |
| 7,908,194 B2 | 3/2011 | Hollas |
| 7,912,560 B2 | 3/2011 | Hood et al. |
| 7,958,013 B2 | 6/2011 | Porat et al. |
| 7,970,830 B2 | 6/2011 | Staggs et al. |
| 8,015,373 B2 | 9/2011 | Ballard et al. |
| 8,015,546 B2 | 9/2011 | Jones et al. |
| 8,024,732 B2 | 9/2011 | Sheehan et al. |
| 8,121,707 B2 | 2/2012 | Karaffa et al. |
| 8,468,335 B2 | 6/2013 | Lin et al. |
| 8,584,114 B2 | 11/2013 | Rabinovich et al. |
| 2002/0004709 A1 | 1/2002 | Peter et al. |
| 2002/0029377 A1 | 3/2002 | Pavela |
| 2002/0049625 A1 | 4/2002 | Kilambi et al. |
| 2003/0036876 A1 | 2/2003 | Fuller et al. |
| 2003/0063013 A1 | 4/2003 | Jin et al. |
| 2003/0076353 A1 | 4/2003 | Blackstock et al. |
| 2003/0163212 A1 | 8/2003 | Smith et al. |
| 2003/0204784 A1 | 10/2003 | Jorapur |
| 2003/0216986 A1 | 11/2003 | Hassan |
| 2005/0011967 A1 | 1/2005 | Skelton-Becker et al. |
| 2005/0132055 A1 | 6/2005 | Neogi |
| 2005/0132064 A1 | 6/2005 | Lo |
| 2005/0138111 A1 | 6/2005 | Aton et al. |
| 2005/0278577 A1 | 12/2005 | Doong et al. |
| 2006/0036876 A1 | 2/2006 | Kitada |
| 2006/0036907 A1 | 2/2006 | Inscoe et al. |
| 2006/0064183 A1 | 3/2006 | Chandhoke |
| 2006/0089886 A1 | 4/2006 | Wong |
| 2006/0095855 A1 | 5/2006 | Britt et al. |
| 2006/0235594 A1 | 10/2006 | Knoefler et al. |
| 2006/0245564 A1 | 11/2006 | Li et al. |
| 2007/0005266 A1 | 1/2007 | Blevins et al. |
| 2007/0074280 A1 | 3/2007 | Callaghan et al. |
| 2007/0094541 A1 | 4/2007 | Kang |
| 2007/0118345 A1 | 5/2007 | Olesen et al. |
| 2007/0208435 A1 | 9/2007 | Schott |
| 2008/0141238 A1 | 6/2008 | Balassan |
| 2008/0154909 A1 | 6/2008 | Dam et al. |
| 2008/0208380 A1 | 8/2008 | Taylor |
| 2008/0222604 A1 | 9/2008 | Murphy |
| 2008/0243311 A1 | 10/2008 | Dahmer et al. |
| 2008/0244449 A1 | 10/2008 | Morrison et al. |
| 2008/0250045 A1 | 10/2008 | Balassanian et al. |
| 2009/0012631 A1 | 1/2009 | Fuller |
| 2009/0037008 A1 | 2/2009 | Moorer et al. |
| 2009/0063650 A1 | 3/2009 | Anslow et al. |
| 2009/0144108 A1 | 6/2009 | Cloud |
| 2009/0204458 A1 | 8/2009 | Wiese et al. |
| 2009/0217163 A1* | 8/2009 | Jaroker ............... G06F 16/9535 715/700 |
| 2009/0265694 A1 | 10/2009 | Bakowski |
| 2009/0300149 A1 | 12/2009 | Ferris et al. |
| 2009/0300423 A1 | 12/2009 | Ferris |
| 2010/0023600 A1 | 1/2010 | Hill et al. |
| 2010/0023918 A1 | 1/2010 | Bernardini et al. |
| 2010/0082844 A1 | 4/2010 | Stoupis et al. |
| 2010/0088150 A1 | 4/2010 | Mazhar et al. |
| 2010/0131624 A1 | 5/2010 | Ferris |
| 2010/0138017 A1 | 6/2010 | Vrba et al. |
| 2010/0223157 A1 | 9/2010 | Kalsi |
| 2010/0278336 A1 | 11/2010 | Tahan et al. |
| 2010/0306379 A1 | 12/2010 | Ferris |
| 2010/0318665 A1 | 12/2010 | Demmer et al. |
| 2011/0022626 A1* | 1/2011 | Plache ............... G05B 19/056 707/769 |
| 2011/0022827 A1* | 1/2011 | Plache ............. G05B 19/41845 713/1 |
| 2011/0117845 A1 | 5/2011 | Kirsch et al. |
| 2011/0126168 A1 | 5/2011 | Ilyayev |
| 2011/0145439 A1 | 6/2011 | Chaturvedi et al. |
| 2011/0154092 A1 | 6/2011 | Dash et al. |
| 2011/0154451 A1 | 6/2011 | Thomas |
| 2011/0179154 A1 | 7/2011 | Ravichandran |
| 2011/0191181 A1 | 8/2011 | Blackhurst et al. |
| 2011/0191500 A1 | 8/2011 | Odayappan et al. |
| 2011/0197097 A1 | 8/2011 | Beaty et al. |
| 2011/0202901 A1 | 8/2011 | Givoni et al. |
| 2011/0208606 A1 | 8/2011 | Hadar |
| 2011/0208695 A1 | 8/2011 | Anand et al. |
| 2011/0231670 A1 | 9/2011 | Shevchenko et al. |
| 2011/0231818 A1 | 9/2011 | Steden |
| 2011/0238458 A1 | 9/2011 | Purcell et al. |
| 2011/0246721 A1 | 10/2011 | Crisan |
| 2011/0264550 A1 | 10/2011 | Fair |
| 2011/0271278 A1 | 11/2011 | Dittrich |
| 2011/0282476 A1 | 11/2011 | Hegemier et al. |
| 2011/0282940 A1 | 11/2011 | Zhang et al. |
| 2011/0314168 A1 | 12/2011 | Bathiche et al. |
| 2012/0010488 A1 | 1/2012 | Henry et al. |
| 2012/0109384 A1 | 5/2012 | Stepanian |
| 2012/0131176 A1 | 5/2012 | Ferris et al. |
| 2012/0143767 A1 | 6/2012 | Abadir et al. |
| 2012/0158972 A1 | 6/2012 | Gammill et al. |
| 2012/0185821 A1 | 7/2012 | Yaseen et al. |
| 2013/0024542 A1* | 1/2013 | Keller ............... G05B 19/0428 709/217 |
| 2013/0024572 A1 | 1/2013 | Chen |
| 2013/0096727 A1 | 4/2013 | Brandt et al. |
| 2013/0124465 A1 | 5/2013 | Pingel et al. |
| 2013/0211559 A1 | 8/2013 | Lawson et al. |
| 2013/0212420 A1 | 8/2013 | Lawson et al. |
| 2013/0282180 A1 | 10/2013 | Layton et al. |
| 2014/0047064 A1 | 2/2014 | Maturana et al. |
| 2014/0047107 A1 | 2/2014 | Maturana et al. |
| 2015/0066979 A1 | 3/2015 | Zhang et al. |

FOREIGN PATENT DOCUMENTS

| | | |
|---|---|---|
| CN | 1862477 A | 11/2006 |
| CN | 101083657 A | 12/2007 |
| CN | 101196740 A | 6/2008 |
| CN | 101208674 A | 6/2008 |
| CN | 101782893 A | 7/2010 |
| CN | 101958805 A | 1/2011 |
| CN | 102105861 A | 6/2011 |
| EP | 1296232 A2 | 3/2003 |
| EP | 1742125 A2 | 1/2007 |
| EP | 1814036 A2 | 8/2007 |

(56) References Cited

FOREIGN PATENT DOCUMENTS

| EP | 2040135 A2 | 3/2009 |
|---|---|---|
| EP | 2237120 A2 | 10/2010 |
| WO | 0075826 A1 | 12/2000 |
| WO | 0228125 A2 | 4/2002 |

OTHER PUBLICATIONS

PCT International Preliminary Report on Patentability issued in connection with related PCT Application No. PCT/US2013/048529 dated Mar. 5, 2015.
Soon et al., Test Strategy and Automation for Complex Systems,dated Mar. 1, 2007, IP.com Prior Art Database Technical Disclosure,IP.com No. IPCOM000147528D, Mar. 1, 2007.
IBM,"Method of Creating a Componentized Architecture for Unifying Resource Environment", Prior Art Database Disclosure, pp. 1-13, Feb. 11, 2010.
Zexi et al., "An Optimal Hysteretic Control Policy for Energy Saving in Cloud Computing", Global Telecommunications Conference, pp. 1-5, 2011.
International Search Report and Written Opinion issued in connection with related Application No. PCT/US2013/048529 dated Oct. 4, 2013.
GE Related Case Form.
Cunning et al., "Automatic Test Case Generation from Requirements Specifications for Real-time Embedded Systems", vol. No. 5, pp. 784-789, 1999.
Husain et al., "Remote device management of WiMAX devices in multi-mode multi-access environment", pp. 1-13, Mar. 31-Apr. 2, 2008.
"Knowledge as a Service (KaaS) Enables the Right Action, Right Now", Cumulus IQ: Knowledge as a Service, 2009.
Altmann et al., "A Marketplace and its Market Mechanism for Trading Commoditized Computing Resources", WEMEP Discussion Paper, Mar. 2010.
"Top ten advantages of Google's cloud", Google Apps for Business, 2011.
Kianjin et al., "File Synchronization of Multi-Machine System Design and Implementation Based Cloud Storage", pp. 1275-1278, 2011.
Salves, "Timeline Cloud Family Edition Reviewed", Pudai LLC, Jul. 18, 2011.
Arefin et al., "CloudInsight: Shedding Light on the Cloud", 3oth IEEE International Symposium on Reliable Distributed Systems, pp. 219-228, Oct. 4-7, 2011.
International Search Report and Written Opinion issued in connection with related PCT Application No. PCT/US2012/044767 dated Sep. 19, 2012.
International Search Report and Written Opinion issued in connection with related PCT Application No. PCT/US2012/044759 dated Sep. 19, 2012.
International Search Report and Written Opinion issued in connection with related PCT Application No. PCT/US2012/044766 dated Oct. 17, 2012.
European Office Action issued in connection with related EP Application No_ 12735995.8 dated May 28, 2015.
European Office Action issued in connection with related EP Application No_ 12737949.3 dated May 28, 2015.
European Office Action issued in connection with related EP Application No_ 12738292.7 dated May 28, 2015.
Unofficial English Translation of Chinese Office Action issued in related with related CN Application No. 201280071226.X dated Nov. 24, 2015.
Unofficial English Translation of Chinese Office Action issued in related with corresponding CN Application No. 201280071178.4 dated Dec. 21, 2015.
Unofficial English Translation of Chinese Office Action issued in connection with corresponding CN Application No. 201280071182.0 dated Dec. 31, 2015.
Ranchal, et al., "Protection of Identity Information in Cloud Computing without Trusted Third Party", Reliable Distributed Systems, 2010 29th IEEE Symposium, on pp. 368-372, Issue Date: Oct. 31, 2010-Nov. 3, 2010.
Search Report issued in connection with corresponding PCT Application PCT/US2012/044770 dated Sep. 19, 2012.

\* cited by examiner

APPARATUS AND METHOD FOR THIRD PARTY CREATION OF CONTROL LOGIC

CROSS REFERENCES TO RELATED APPLICATIONS

This application is a continuation of U.S. patent application Ser. No. 14/376,535, filed on Nov. 24, 2014, which claims priority to U.S. Provisional Application Ser. No. 61/583,956, filed on Jan. 6, 2012, the contents of which are incorporated herein by reference in its entirety.

PCT International application no, PCT/US2012/044770, entitled "Apparatus and Method for Third Party Creation of Control Logic"; and PCT International application no. PCT/US2012/044766, entitled "Method and Apparatus for Network Based Testing"; and PCT International application no. PCT/US2012/0447, entitled "Apparatus and Method for Synchronization of Control Logic"; and PCT International application no. PCT/US2012/044767, entitled "Apparatus and Method for Creating and Presenting Control Logic";

filed on the same date, Jun. 29, 2012, the contents of which are incorporated herein by reference in their entireties.

BACKGROUND OF THE INVENTION

Field of the Invention

The subject matter disclosed herein relates to the creation of control logic by third parties.

Brief Description of the Relates Art

Automated devices perform various functions and these devices typically include a controller or control device that controls or manages the execution of these functions. For example, robotic controllers (e.g., those that utilize microprocessors) often control the functions of a robot and the robot can perform various manufacturing tasks. Assembly line controllers are used to control the various functions performed on or at an assembly line. A consumer device controller may be used to control the operation and functioning of any type of consumer device (e.g., a washer, dryer, dishwasher, building security system, building lighting system, building heating system, or microwave oven). Together, these types of controllers provide automated functions and are generally referred to as automation controllers.

An automation controller typically includes and utilizes control logic to perform its functions. Control logic may include computer software and/or computer hardware that performs various predetermined functions. For example, an assembly line controller (e.g., for a bottling plant) may include a microprocessor that operates programmed computer software to regulate the speed and other functions associated with operating an assembly line that fills and caps the bottles. In another example, a controller may also include a microprocessor running programmed computer software that regulates various device parameters (e.g., temperature, pressure, or operating speed). In yet another example, a water system controller may include control logic that controls pumps and sprinklers.

Conventionally, when a customer such as a factory owner wishes to have control logic built or changed they generally approach a known control logic provider. Moreover, the customer may have to approach multiple control logic providers if they want to obtain multiple quotes for the control logic they desire to obtain. This process proves time-consuming, tedious, and burdensome for customers. Additionally, third party providers generally have no easy way of knowing whether their solution is the type of solution desired by a larger group of customers. Consequently, features that may have been of interest to multiple consumers are not evaluated or included in the control logic, thereby further increasing the cost of the finished product.

BRIEF DESCRIPTION OF THE INVENTION

Embodiments of the present invention provide third party developed control logic for automation controllers that is accessible to customers using a communication network. At least one tool is provided for a third party to develop control logic for an automation controller. The automation controller is remotely located from the communication network. A hardware platform on which to operate the control logic is selected. Once built, the control logic is linked to at least one operational characteristic of the hardware platform such that the control logic is operable to perform at least one predetermined function of the automation controller using the hardware platform.

In some aspects, the control logic developed by the third party is not limited to integration on a single type of hardware platform. In other aspects, the linking is performed at or shortly before the integration of the control logic to the selected hardware platform.

In other examples, testing and validating of the control logic is performed at the communication network. In still other examples, at the communication network, results of the testing and the validating of the control logic are analyzed according to a predetermined criteria. In some approaches, when the predetermined criteria is satisfied, the control logic is released to a network-based web store at the communication network. The control logic may then be selectively released for sale or use to one or more potential customers. Alternatively, not all control logic may be released for sale and some control logic may be given for free to some customers. In other aspects, a purchase order for the control logic is received from the potential customer. In other aspects, a third party could monitor control logic sales forums and notice a need for control logic having certain features. In this case, the third party could decide to develop the control logic themselves.

Testing may be accomplished in different ways. For instance, the testing may be automatically accomplished without manual intervention. Alternatively, the testing may be at least partially manually accomplished. In yet another aspect, the testing and validating of the control logic may be performed at a third party testing platform.

In other aspects, an apparatus for providing third party developed control logic for automation controllers to customers using a communication network includes an interface and a processor. The interface has an input and an output.

The processor is coupled to the interface and is configured to provide at least one tool for a third party to develop control logic for an automation controller at the output of the interface. The automation controller is remotely located from the communication network. The processor is further configured to select a hardware platform on which to operate the control logic. The processor is still further configured to link the control logic to at least one operational characteristic of the hardware platform such that the control logic is operable to perform at least one predetermined function of the automation controller using the hardware platform.

BRIEF DESCRIPTION OF THE DRAWINGS

For a more complete understanding of the disclosure, reference should be made to the following detailed description and accompanying drawings wherein.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE INVENTION

In the approaches described herein, third parties create control logic that is made available to one or more customers. Third parties include, for example, entities or developers that do not directly deploy the logic in their business, i.e., the third party develops the control logic for the use of another individual or entity. In one instance, a third party is a software developer that develops software for factory owners, i.e., the third party is not the factory owner. A customer may also transmit an order to a communication platform at a communication network where the order is presented to third party providers. Interested third party providers bid for the opportunity to create the control logic and one of the bidders is selected. After the control logic is built, it may be presented to other customers for purchase.

Additionally, third party providers may view or examine the configuration or design of already released control logic that is presented to others who may be interested in obtaining the control logic. In so doing, one technical effect is that these third party providers may consider actual marketplace factors used in control logic design and tailor the production of their own control logic in consideration of these factors, thereby reducing the cost of control logic and better fitting the needs of more consumers.

There are various advantages to the approaches described herein. For example, one technical effect is that customers can also order control logic with a minimum amount of effort using the approaches described herein. In addition, another technical effect is that various control logic solutions can be displayed to large groups of potential consumers thereby increasing the purchasing options available to these consumers.

Figure 1:
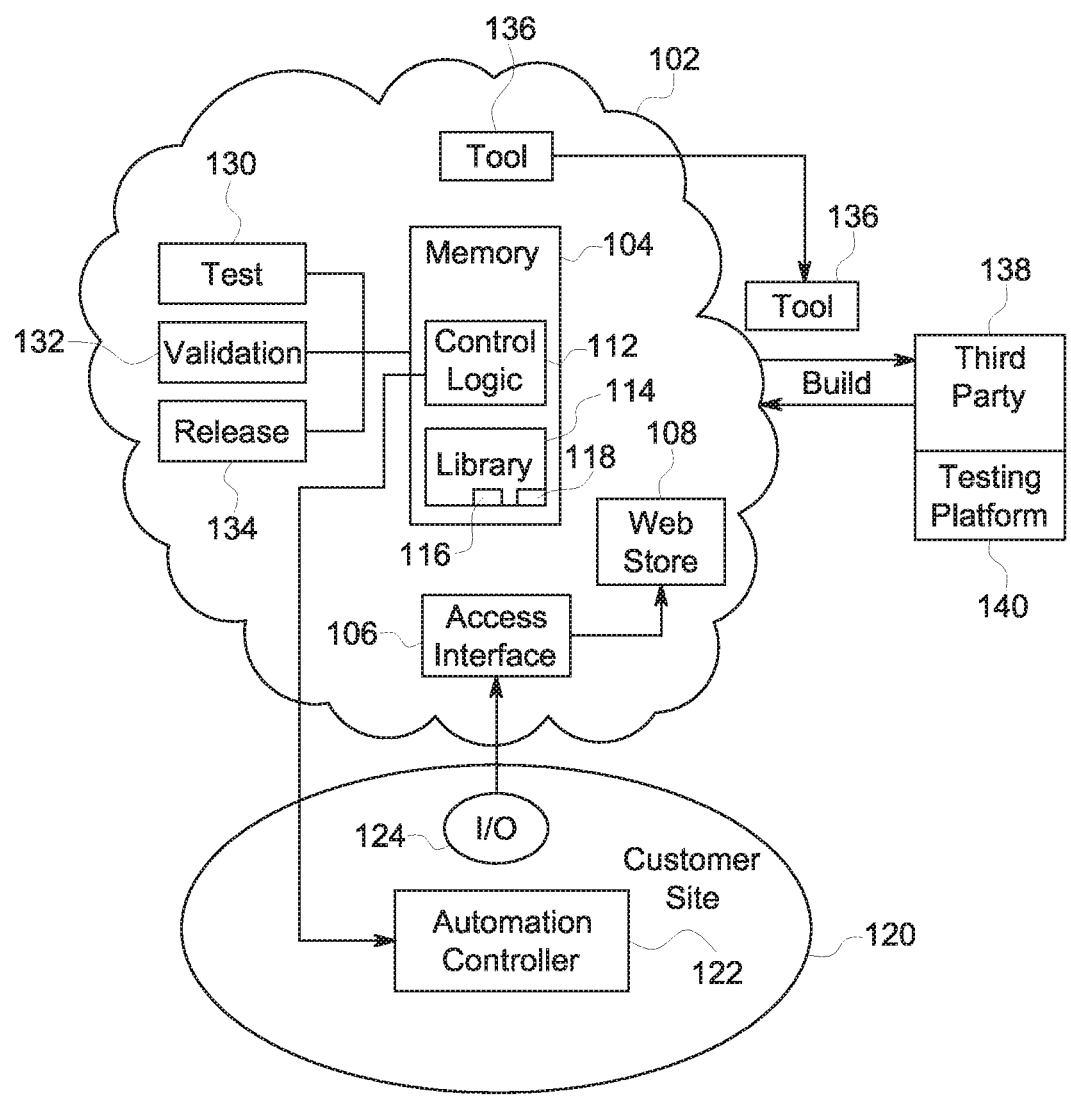
FIG. 1 comprises a block diagram of a communication network that facilitates the third party provision of control logic according to various embodiments of the present invention.

Referring now to FIG. 1, a system for the creation and presentation of control logic is described. The system includes a communication network 102. The communication network 102 is coupled to a customer site 120. The coupling provides a communication link and may be accomplished using any approach, e.g., wired or wireless connections. The customer site 120 includes an automation controller 122 and a customer interface 124 (e.g., a personal computer). The customer site 120 may be any factory, office, home, consumer device, power plant, communication facility (e.g., a base station) or any other location that may advantageously use an automation controller.

The communication network 102 is any type of communication network such as the Internet, a computer network, a cellular telephone network or any combination of these or other networks. In this respect, the communication network 102 may include any number of devices such as computers, access points, routers, and servers, to mention a few examples.

The communication network 102 includes a memory 104, an access interface 106, and a web store 108. The access interface 106 is any combination of hardware and/or software that receives commands from the interface 124. The web store 108 is any combination of hardware and/or software that provides an accessible platform for control logic to be displayed and purchased. For example, the web site 108 may be implemented on a server and present/receive information in any form of known web sites that operate on the Internet.

The memory 104 (which can be any type of memory device or combination of memory devices) includes a control logic (representation) 112 and a library 114 with modules 116 and 118. The memory 104 as well as the other element of the communication network 102 may physically reside on any type of device or devices such as servers, access points, computers, or routers. It will be appreciated that control logic 112 may be eventually downloaded to particular automation controllers. Thus, the copy of the control logic copy stored at the network 102 can be considered a representation of the control logic at the automation controllers.

As mentioned, the library 114 includes modules 116 and 118. Alternatively, a third party can create the entire control logic 112 (without the modules 116 and 118). In other aspects, the third party can create pieces of different types of logic (e.g., the same type of control logic for different automation controllers or different types of control logic for the same automation controller).

The control logic 112 is a description or model (in one example, implemented as programmed computer software or code) that represents or mirrors the control logic at the automation controller 122. More specifically, the control logic 112 describes the functions, workings, operation, inputs, outputs, and other characteristics of the operation of the associated control logic of the automation controller 122. In other aspects, the control logic 112 may be hardware, software, or combinations of hardware and software elements. In one aspect, the control logic (representation) 112 is the same as the control logic at the automation controller. Consequently, changes can be made to the control logic 112 without halting the operation of the automation controller 122. These changes can be later downloaded to the automation controller 122.

The control logic 112 utilizes modules 116 and 118 from the library 114. In this example, the modules 116 and 118 are programmed software modules that perform specified functions. Although only two modules 116 and 118 are shown, it will be appreciated that any number of modules may be used. Further, it will be understood that different control logic representations may utilize (share) the same module or modules.

Automation controller 122 may be any device, combination of devices, or network of devices that are implemented in any combination of hardware or software. In one example, the automation controller 122 is an assembly line controller. In other examples, the automation controller 122 is a controller for a pumping network (e.g., pumps, valves, pipes, sprinklers, and their associated controllers). Other applications of automation controllers and systems that utilize automation controllers are possible.

The interface 124 is any type of interface device that interacts with a human such as a personal computer, a laptop, a cellular telephone, or a personal digital assistant. Other examples of interfaces are possible.

The communication network 102 also includes a test module 130, a validation module 132, and a release module 134. The test module 130 performs tests of the control logic 112 (e.g., to ensure that it operates properly). The validation module 132 performs validation procedures for the control logic 112 (e.g., to ensure the control logic meets customer or third party quality requirements). The release module 134 releases the control logic 112 for viewing and potential purchase by third parties and to the customer that ordered the control logic. A tool 136 includes information that allows a third party 138 to build control logic. A third party testing platform 140 may in some instances be used to test control logic instead of at the communication network 102. The third party issues build commands to build the control logic 112 that is stored at the memory 104. This control logic 112 if purchased by a customer may be downloaded to their automation controller 122 by any appropriate communication link (e.g., wired, wireless, or the Internet).

In one example of the operation of the system of FIG. 1, third party developed control logic for automation controllers is provided to customers utilizing a communication network. A tool 136 is provided for the third party 138 to develop control logic for the automation controller 122 when the owner of the automation controller 122 places an order for the control logic. The automation controller 122 is remotely located from the communication network 102. A hardware platform on which to operate the control logic 112 is selected. For instance, a particular microprocessor model or programmed logic controller (PLC) model is selected. Alternatively, not all logic may be for sale and some may be released for free to some customers. The control logic 112 is linked to at least one operational characteristic of the hardware platform (e.g., processor type, operational speed, input/output configuration) such that the control logic 112 is operable to perform at least one predetermined function of the automation controller using the hardware platform.

In some aspects, the control logic 112 developed by the third party 138 is not limited to integration on a single type of hardware platform. In other aspects, the linking is performed at or shortly before the integration of the control logic to the selected hardware platform (e.g., within hours or minutes before integration).

In other examples, testing and validating is performed of the control logic at the communication network 102, for instance by the modules 130 and 132. In still other examples, at the communication network 102, results of the testing and the validating of the control logic are analyzed according to a predetermined criteria. In some approaches, when the predetermined criteria is satisfied, the control logic 112 is released to a network-based web store 108 at the communication network 102. The control logic 112 may then be released to at least one potential customer. In other aspects, a purchase order for the control logic is received from the potential customer (e.g., via interface 124) and installation of the control logic 112 is facilitated at an automation controller 122 of the potential customer.

Testing may be accomplished in different ways. For instance, the testing is automatically accomplished without manual intervention. Alternatively, the testing may be at least partially manually accomplished. In another aspect, the testing and validating of the control logic may be performed at the third party testing platform 140.

Figure 2:
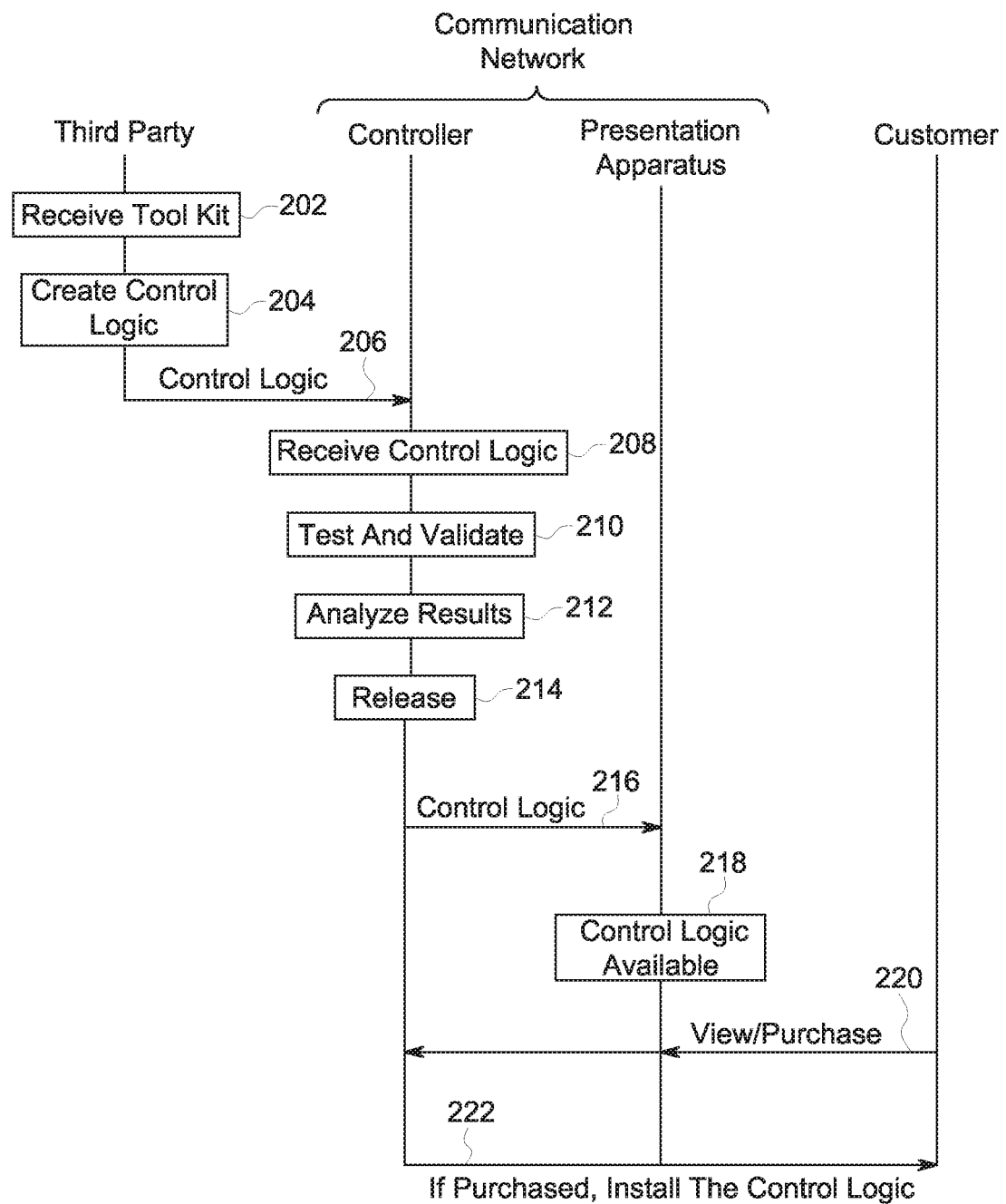
FIG. 2 comprises a flow chart showing an approach for the provision of control logic using a third party according to various embodiments of the present invention.

Referring now to FIG. 2, one example of an approach for the provision of control logic using a third party is described. At step 202, a tool is received by a third party. In one example, the tool is downloaded from an application (or network) controller and/or website. The tool allows the third party to create control logic for a potential customer. The tool is described in greater detail with respect to FIG. 3. At step 204, the third party creates or builds the control logic using the information or other features provided by the tool. Third parties include, for example, entities or developers that do not directly deploy the logic in their business, i.e., the third party develops the control logic for the use of another individual or entity. In one instance, a third party is a software developer that develops software for factory owners, i.e., the third party is not the factory owner.

At step 206, the control logic is sent to the application controller at the communication network. At step 208, the application controller at the communication network receives the control logic. At step 210, the application controller tests and validates the control logic at the communication network. In other aspects, the testing and validation may be accomplished utilizing a third party testing platform. At step 212, the application controller analyzes the results of the testing and validation processes and if the results are satisfactory, at step 214 releases the control logic to the customer or for presentation and potential purchase or use by others. If the results are not satisfactory, the owner of the control logic may be informed.

At step 216, the control logic is sent from the application controller to a presentation apparatus (e.g., web-based store). At step 218, the control logic is made available for viewing by potential customers or by other third party providers, for example at a website. At step 220, the control logic is viewed and/or purchased by a customer and this is communicated to the controller.

At step 222, if the control logic is purchased, it is installed by the application controller at the automation controller of the customer. The control logic is linked to at least one operational characteristic of the hardware platform such that the control logic is operable to perform at least one predetermined function of the automation controller using the hardware platform. In some aspects, the linking is performed at or shortly before the integration of the control logic to the selected hardware platform. In some other aspects, the control logic developed by the third party is not limited to integration on a single type of hardware platform. In other aspects, multiple versions of the control logic developed by the third party may be stored and maintained.

Figure 3:
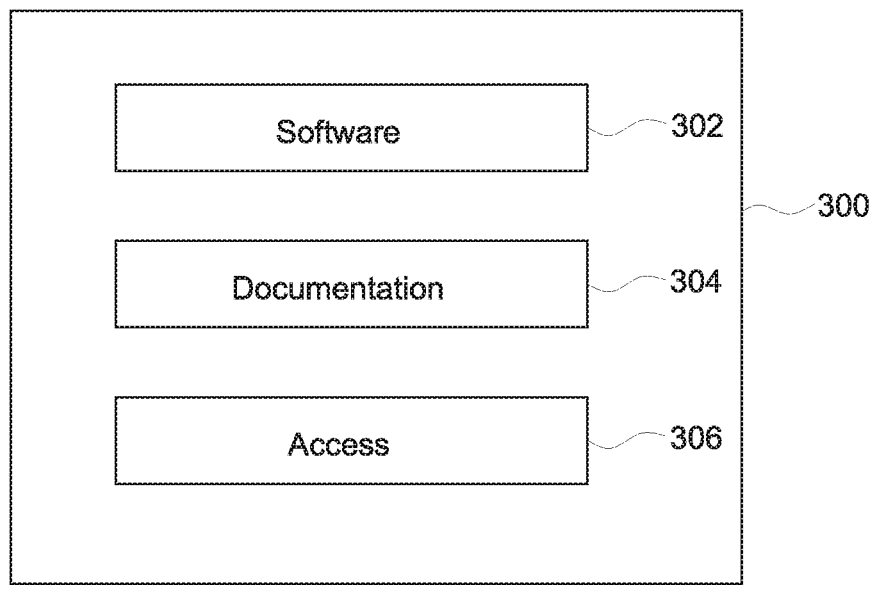
FIG. 3 comprises a block diagram of a tool kit according to various embodiments of the present invention.

Referring now to FIG. 3, one example of a tool kit 300 is described. In this example, the tool kit 300 includes software 302, documentation 304, and access 306. The software 302 allows a third party to build the control logic. The software 302 may be accessed via web site and stored at a communication network. The software 302 may actually be part of the tool kit or the tool kit may provide access to the software 302, with the software 302 actually residing at the communication network. The documentation 304 may show the third party how to design the control logic, include customer specific requirements or specifications, or otherwise facilitate the creation of the control logic by the third party provider. In one aspect, the access 306 may be a password to the web site that allows the third party provider to create the control logic.

Figure 4:
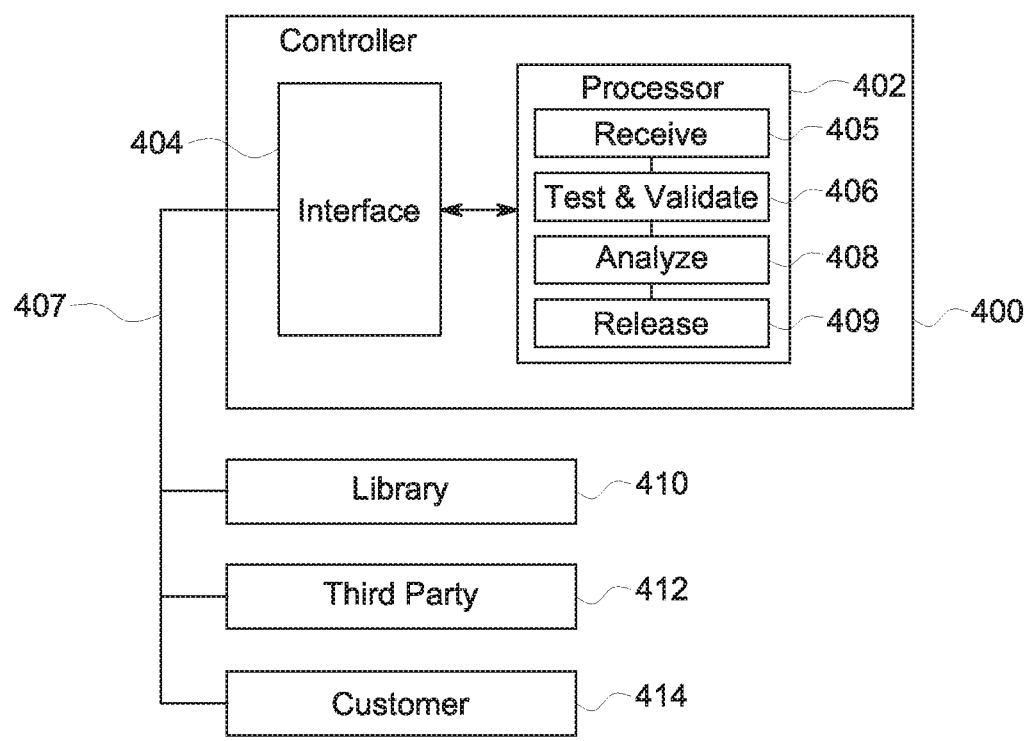
FIG. 4 comprises a block diagram of a network controller that is used to build control logic according to various embodiments of the present invention.

Referring now to FIG. 4, one example of a communication network (or application) controller 400 is described. The communication network controller 400 resides at a communication network and is remotely located from the automation controllers (i.e., it is separated physically from the automation controllers by a substantial distance).

The communication network controller 400 includes a processor 402 and interface 404. The processor 402 includes a receive module 405, a test and validate module 406, an analyze module 408, and a release module 409. The interface 404 is coupled to communication medium 407. Communication medium 407 (e.g., any wired or wireless connection) is coupled to a library 410 that includes library routines, a third party 412, and a customer 414.

The receive module 405 receives a representation of the control logic for testing purposes. The test and validate module 406 performs various tests on the control logic. For example, various industry or user specific tests may be performed. The analyze module 408 analyzes the results of the testing, for example, whether the tests have been passed or failed. The release module 409 determines whether to release the control logic to the customer that ordered the control logic or other potential customers based upon the results of the testing.

The interface 404 provides formatting and control functions between the processor 402 and the communication medium 407. The processor 402 is any processing device such as a microprocessor or the like. The communication network controller 400 may be disposed or implemented in any device such as an access point, server, or base station, to mention a few examples.

Figure 5:
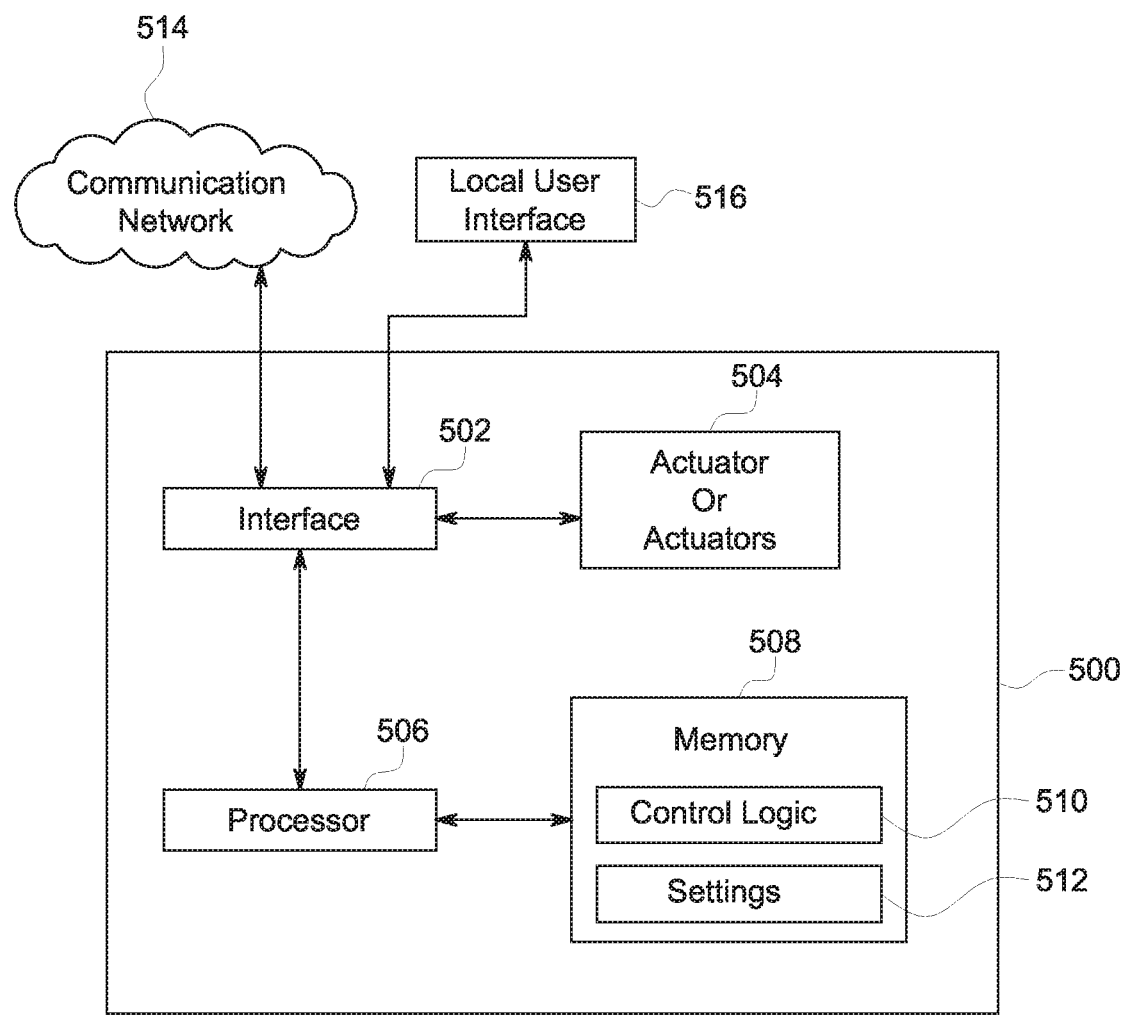
FIG. 5 comprises a block diagram of an automation controller according to various embodiments of the present invention.

Referring now to FIG. 5, one example of an automation controller 500 is described. The automation controller 500 includes an interface 502, one or more actuators 504, a processor 506, and a memory 508 (that includes control logic 510 and settings 512).

The interface 502 facilitates communications between the automation controller 500 and a communication network 514, and between the automation controller 500 and a local user interface 516. In this respect, the interface 502 includes hardware and/or software that interprets or translates commands and/or other information between the communication network 514 and the automation controller 500, and between the automation controller 500 and a local user interface 516.

The actuators 504 actuate physical or logical devices (e.g., the mechanical components of a valve or a sprinkler motor, to mention two examples). The function of the actuators 504 is to physically implement one or more of the functions associated with or provided by the controller 500.

The processor 506 is any programmed logic device such as a microprocessor or the like. Control logic 510 implements control functions that control actuators 504. Settings 512 are settings or other parameters (e.g., valve levels, pressures, temperatures, speeds) for the actuators 504.

Local user interface 516 may be a personal computer, cellular phone, or any other device that communicates with network 514 and/or controller 500. The communication network 514 is the location where the control logic 510 is built.

In one example of the operation of the system of FIG. 5, third parties develop control logic 510. The customer sends an order (via the local user interface 516) to the communication network 514. As described elsewhere herein, third parties are provided with tools to build the control logic 510 and this control logic 510 can be downloaded to the memory 508. The control logic 510 may also be featured at a web site at the communication network 514 where it may be made available for purchase, viewing, or use by other customers. Other third party providers may also view this control logic.

Preferred embodiments of this invention are described herein, including the best mode known to the inventors for carrying out the invention. It should be understood that the illustrated embodiments are exemplary only, and should not be taken as limiting the scope of the invention.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the scope of the following claims.

What is claimed is:

1. A method of providing control logic for automation controllers using a communication network, the method comprising:

providing, by a first party that distributes control logic for an automation controller owned by a second party, at least one interface for a third party to provide control logic for the automation controller, the third party being an entity other than the second party, wherein the automation controller is remotely located from the communication network;

receiving, by the first party at the communication network, the control logic from the third party via the at least one interface; and providing the control logic to a network-based web store operated by the first party at the communication network, wherein the control logic is available for viewing by other third party providers when provided to the network-based web store.

2. The method of claim 1, further comprising deploying the control logic to the automation controller owned by the second party.

3. The method of claim 1, further comprising:
prior to providing the control logic to the network-based web store operated by the first party at the communication network:
selecting a hardware platform on which to operate the control logic;
linking the control logic to at least one operational characteristic of the hardware platform such that the control logic is operable to perform at least one predetermined function of the automation controller using the hardware platform;
testing and validating the control logic; and
analyzing a result of the testing and the validating of the control logic according to a predetermined criteria.

4. The method of claim 1, wherein the second party is a customer of the network-based web store.

5. The method of claim 1, wherein the automation controller is at least one of an assembly line controller, or a water system controller.

6. The method of claim 1, wherein the automation controller controls at least one of temperature, pressure, or operating speed.

7. The method of claim 1, wherein the control logic is received at the communication network by a communication network controller.

8. The method of claim 1 further comprising: receiving a purchase order for the control logic from the second party.

9. The method of claim 3, wherein the testing is automatically accomplished without manual intervention.

10. The method of claim 3, wherein the testing is manually accomplished.

11. The method of claim 1 further comprising: testing and validating the control logic at a third party testing platform.

12. An apparatus for providing control logic for automation controllers using a communication network operated by a first party, the apparatus comprising:
an interface having an input and an output;
a processor, the processor coupled to the interface, the processor configured to:
provide, by a first party that distributes control logic for an automation controller owned by a second party, at least one interface for a third party to provide control logic for the automation controller, the third party being an entity other than the second party, wherein the automation controller is remotely located from the communication network;
receive, by the first party at the communication network, the control logic from the third party via the at least one interface;
select a hardware platform on which to operate the control logic;
link the control logic to at least one operational characteristic of the hardware platform such that the control logic is operable to perform at least one predetermined function of the automation controller using the hardware platform;
test and validate the control logic;
analyze a result of the testing and the validating of the control logic according to a predetermined criteria; and
when the predetermined criteria is satisfied, provide the control logic to a network-based web store operated by the first party at the communication network wherein the control logic is available for viewing by other third party providers when provided to the network-based web store.

13. The apparatus of claim 12, further comprising deploying the control logic to the automation controller owned by the second party.

14. The apparatus of claim 12, wherein the processor creates the link at or before integrating the control logic to the selected hardware platform.

15. The apparatus of claim 12, wherein the second party is a customer of the network-based web store.

16. The apparatus of claim 12, wherein the automation controller is at least one of an assembly line controller, or a water system controller.

17. The apparatus of claim 12, wherein the control logic is received at the communication network by a communication network controller.

18. The apparatus of claim 12, wherein the processor is further configured to receive a purchase order for the control logic from a potential customer at the input of the interface.

19. The apparatus of claim 12, wherein the processor accomplishes the testing automatically without manual intervention.

20. A non-transitory computer readable storage medium comprising instructions that, when executed by a processor, cause the processor to provide control logic for automation controllers using a communication network by configuring the processor to:
provide, by a first party that distributes control logic for an automation controller owned by a second party, at least one interface for a third party to provide control logic for the automation controller, the third party being an entity other than the second party, wherein the automation controller is remotely located from the communication network;
receive, by the first party at the communication network, the control logic from the third party via the at least one interface;
select a hardware platform on which to operate the control logic;
link the control logic to at least one operational characteristic of the hardware platform such that the control logic is operable to perform at least one predetermined function of the automation controller using the hardware platform;
test and validate the control logic;
analyze a result of the testing and the validating of the control logic according to a predetermined criteria; and
when the predetermined criteria is satisfied, provide the control logic to a network-based web store operated by the first party at the communication network and presenting the control logic to the second party, wherein the control logic is available for viewing by other third party providers when provided to the network-based web store.

* * * * *